(12) United States Patent
Elley et al.

(10) Patent No.: US 6,883,100 B1
(45) Date of Patent: Apr. 19, 2005

(54) METHOD AND SYSTEM FOR DYNAMIC ISSUANCE OF GROUP CERTIFICATES

(75) Inventors: Yassir K. Elley, Cambridge, MA (US); Anne H. Anderson, Acton, MA (US); Stephen R. Hanna, Bedford, MA (US); Sean J. Mullan, Watertown, MA (US); Radia J. Perlman, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/309,045

(22) Filed: May 10, 1999

(51) Int. Cl.[7] .................................................. G06F 9/00
(52) U.S. Cl. ...................................... 713/201; 713/202
(58) Field of Search .............................. 713/201, 202, 713/200, 154, 158

(56) References Cited

U.S. PATENT DOCUMENTS

| | | |
|---|---|---|
| 5,173,939 A | 12/1992 | Abadi et al. |
| 5,220,604 A | 6/1993 | Gasser et al. |
| 5,224,163 A | 6/1993 | Gasser et al. |
| 5,261,002 A | 11/1993 | Perlman et al. |
| 5,283,830 A | 2/1994 | Hinsley et al. |
| 5,315,657 A | 5/1994 | Abadi et al. |
| 5,586,260 A | 12/1996 | Hu |

(Continued)

FOREIGN PATENT DOCUMENTS

| | | |
|---|---|---|
| EP | 0779570 | 6/1997 |
| EP | 0942568 | 9/1999 |
| WO | WO98/10381 | 3/1998 |
| WO | WO 99/41878 | 8/1999 |

OTHER PUBLICATIONS

Kaufman, Charlie et al., "Network Security, Private Communication in a Public World," PTR Prentice Hall, 1995, chapters 5, 7 and 8 pp. 129–161, and pp. 177–222.

(Continued)

*Primary Examiner*—Norman M. Wright
(74) *Attorney, Agent, or Firm*—Kudirka & Jobse, LLP

(57) ABSTRACT

In accordance with the invention, on-line group servers issue group membership or group non-membership certificates upon request. Furthermore, when a requester requests a group certificate for a particular entity, the associated group server makes a dynamic decision regarding the entity's membership in the group rather than simply referring to a membership list. These capabilities provide for, among other things, the implementation of "nested" groups, wherein an entity may indirectly prove membership in a first, or nested, group by proving membership in a second group which is a member of the first group. In the nested group situation, the dynamic decision may involve the group server of the nested group obtaining proof of the entity's membership or non-membership in the second group. Proof of membership or non-membership may include a group certificate and/or a group membership list.

12 Claims, 6 Drawing Sheets

U.S. PATENT DOCUMENTS

| | | | |
|---|---|---|---|
| 5,764,772 | A | 6/1998 | Kaufman et al. |
| 5,901,227 | A | 5/1999 | Perlman |
| 5,991,807 | A | 11/1999 | Schmidt et al. |
| 6,079,020 | A * | 6/2000 | Liu ............................ 713/201 |
| 6,088,805 | A | 7/2000 | Davis et al. |
| 6,138,235 | A | 10/2000 | Lipkin et al. |
| 6,158,011 | A * | 12/2000 | Chen et al. ................. 713/201 |
| 6,212,634 | B1 | 4/2001 | Geer et al. |
| 6,216,231 | B1 | 4/2001 | Stubblebien |
| 6,223,291 | B1 | 4/2001 | Puhl et al. |
| 6,263,434 | B1 | 7/2001 | Hanna et al. ............... 713/156 |
| 6,275,941 | B1 | 8/2001 | Saito et al. |
| 6,301,658 | B1 | 10/2001 | Koehler |
| 6,308,274 | B1 | 10/2001 | Swift |
| 6,366,913 | B1 | 4/2002 | Fitler et al. |
| 6,370,648 | B1 | 4/2002 | Diep |
| 6,397,329 | B1 | 5/2002 | Aiello et al. |
| 6,405,313 | B1 | 6/2002 | Reiter et al. |
| 6,438,690 | B1 | 8/2002 | Patel et al. |
| 6,496,858 | B1 | 12/2002 | Frailong et al. |
| 2002/0144149 | A1 | 10/2002 | Hannah et al. |
| 2003/0028585 | A1 | 2/2003 | Yeager et al. |
| 2003/0041141 | A1 | 2/2003 | Abdelaziz et al. |
| 2003/0055894 | A1 | 3/2003 | Yeager et al. |
| 2003/0055898 | A1 | 3/2003 | Yeager et al. |
| 2003/0056093 | A1 | 3/2003 | Huitema et al ............. 713/156 |
| 2004/0054899 | A1 | 3/2004 | Balfanz et al. ............. 713/168 |

OTHER PUBLICATIONS

Kaufman, Charlie et al., "Network Security, Private Communication in a Public World," PTR Prentice Hall, 1995, pp. 455–459.

Micali, "Enhanced Certificate Revocation System," MIT Laboratory for Computer Science.

Micali, "Efficient Certificate Revocation," MIT Laboratory for Computer Science (Mar. 22, 1996).

Myers et al., "X.509 Internet Public Key Infrastructure Online Certificate Status Protocol OCSP," (Sep., 1998).

Rivest, "Can We Eliminate Certificate Revocation Lists?" MIT Laboratory for Computer Science.

Ryutov et al., "Access Control Framework for Distributed Applications," *USC/Information Sciences Institute* (Aug. 7, 1998).

Woo et al., "A Framework for Distributed Authorization" Nov. 1993, ACM $1^{st}$ Conference Computer and Communication Security, pp. 112–118.

Gaul et al., "Mining Generalized Association Rules for Sequential and Path Data," 2001, *IEEE*, pp. 593–596.

Morrissey, P., "Demystifying Crisco Access Control Lists," Apr. 1998, *Network Computing*, pp. 116, 118 and 120.

International Search Report completed on Oct. 2, 2002 and mailed Oct. 9, 2002.

* cited by examiner

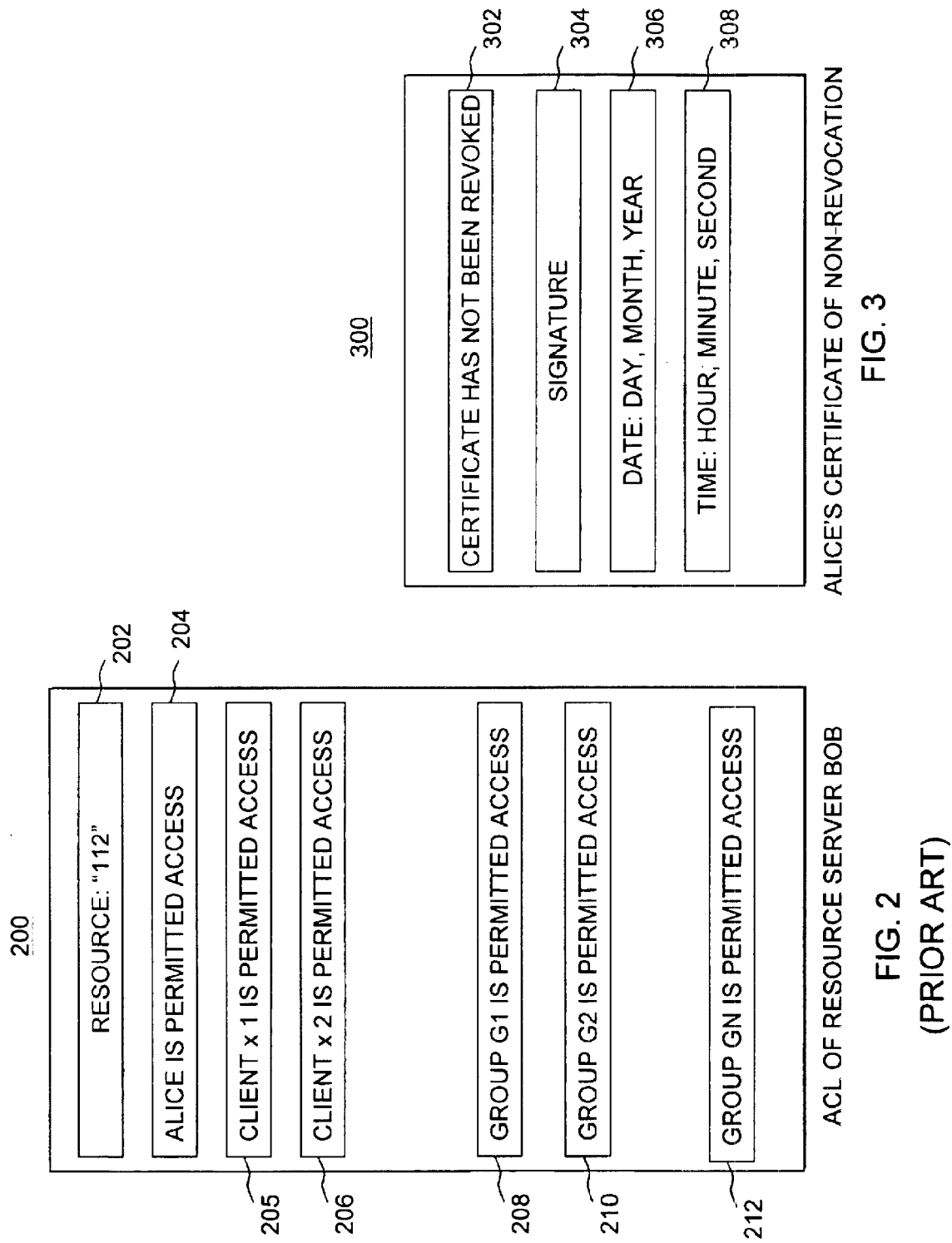

METHOD AND SYSTEM FOR DYNAMIC ISSUANCE OF GROUP CERTIFICATES

RELATED CASES

U.S. Patent Application entitled "METHOD AND SYSTEM FOR PRESENTATION OF NON-REVOCATION CERTIFICATES" U.S. patent application Ser. No. 09/892,813, filed on Jun. 27, 2001, Publication Number 0005114 published on Jan. 2, 2003; and U.S. Patent Application entitled "METHOD AND SYSTEM FOR PROVING MEMBERSHIP IN A NESTED GROUP USING CHAINS OF CREDENTIALS" U.S. patent application Ser. No. 09/310,165, filed on May 8, 2000, Publication Number 1179243 published on Feb. 13, 2002.

FIELD OF THE INVENTION

This invention relates generally to authorization for a client to access a service in a computer network, and more particularly to the use of group membership and non-membership certificates.

BACKGROUND OF THE INVENTION

During ordinary operation of computer networks it is usual for a client to access a server and to request access to a resource provided by that server. A client may be thought of as a program running on a work station, desktop type computer, personal digital assistant (PDA) or even an embedded device, and a server may be thought of as a program performing a service for a plurality of clients. The client may also be thought of as the computer running the client software, and the server may also be thought of as the computer running the server software. For some purposes, the client may be thought of as a user on whose behalf a request is being made. In some cases, the same computer may run both the client software and the server software. The service is ordinarily provided by the execution of a server program at the request of the client. Specifically, the service provides a resource to the client. The resource may be any operation that is executed, affected or controlled by a computer, such as a word processing or spread-sheet program, the transfer of files, or some other data processing function. The resource access may also include the ability to read or to modify entries in a data base, execute or modify a program maintained by the server, or even modify data maintained by another computer in the system.

In deciding whether or not to grant access to a resource, a resource server must answer two questions:

A. "Is the client correctly identifying himself?" and

B. "Is the identified client authorized to access the requested resource?"

The first question involves a process called "client authentication." The second involves reference to an authorization decision mechanism, such as an Access Control List (ACL) maintained by the server and containing a list of individual clients and/or client groups who are permitted access to the resource. The present invention relates to the determination of group membership or group non-membership of resource-requesting clients.

Client authentication can be accomplished using public key cryptographic methods, as described in *Network Security, Private Communication in a Public World*, Charlie Kaufman, Radia J. Perlman, and Mike Speciner, PTR Prentice Hall, Englewood Cliffs, N.J., 1995, (Kaufman et al.) at chapters 5, and 7 and 8, pages 129–161 and 177–222.

Specifically, client Alice can authenticate herself to resource server Bob if she knows her private key and Bob knows Alice's public key. Bob has obtained Alice's public key in an identity certificate from a trusted certification authority or from a certification authority in a chain extending from a trusted authority. Other methods of authentication may be used and the present invention does not depend on which method is used.

An identity certificate may be revoked. One common method of dealing with revocation involves the use of Certificate Revocation Lists (CRLs) which are analogous to the books of revoked credit card numbers that were at one time published and distributed periodically to merchants. Like these books, CRLs suffer from being expensive to distribute and are therefore infrequently distributed. There may also be a significant period of time between certificate revocation and CRL distribution during which the resource server is unaware of the revocation.

For maximum security, the certificate authority may be off-line and therefore inaccessible on a transaction-by-transaction basis. Moreover, issuance of an identity certificate may be a relatively lengthy process so that, even if the certificate authority is on-line, it is impractical to issue an up-to-date certificate for each transaction. An alternative approach to certificate revocation involves the use of on-line revocation servers which maintain lists of revoked identity certificates. With on-line revocation servers, up-to-date revocation status can be determined.

At the same time, if a revocation server's private key has been compromised, the damage will be more limited than if an on-line certification authority's private key were compromised. Specifically, if the certification authority's private key were compromised, the authority might issue new certificates to unauthorized clients. On the other hand, a compromised revocation server would result only in continued access by a client with revoked authorization. A compromised revocation server can never grant unauthorized access to a client who has never had authorized access. Although a compromised revocation server may wrongly revoke an authorized client, the revocation would only be a denial-of-service attack.

The use of on-line revocation servers, which is analogous to the method employed today for the authorization of credit card purchases, is also expensive because the resource server usually contacts an on-line revocation server at each transaction to determine whether the certificate has been revoked. The OCSP (On-line Certificate Status Protocol) Internet draft of the PKIX working group, draft-ietf-pkix-ocsp-07.txt (posted September, 1998, at <http://www.normos.org/ietf/draft/draft-ietf-pkix-ocsp07.txt>), specifies that the revocation status for each certificate can be retrieved from the revocation server and cached by the resource server verifying that certificate. Although caching improves resource server efficiency, it still places a burden on the resource server which may already be burdened with the processing of resource access requests.

An authentication and authorization arrangement introduced by the Open Software Foundation (OSF) and known as the Distributed Computing Environment (DCE) model has a central database on a machine known as a "privilege server" or "central trusted authority." When a client logs on to the system the privilege server issues a secret, or symmetric, key certificate (as opposed to a public, or asymmetric, key certificate) identifying all the groups of which the client is a member. The client presents this certificate to any server on which the client wishes to access a resource. The resource server has an ACL for the resource, and the ACL includes both authorized clients and client groups. If neither the client nor any one of the groups of which the client is a member is listed in the ACL, client access is denied. This approach saves some work for the server, but requires that a central trusted authority know all the groups of which the client is a member and also that the client's group list is small enough so that presentation of the entire collection is not unwieldy. The DCE model is described in Kaufman et al. at Section 17.7, pages 455–459.

Another approach to authentication and authorization is provided by the Windows NT operating system, a product of the Microsoft Corporation of Redmond, Washington. NT has the concept of "domains" where a local group is known only within that domain, although clients from other domains can be members of a local group. NT also has "global" groups whose members must be individuals (not groups) from one domain. A global group of one domain can be listed as a member of a local group in any other domain having a trust relationship to the first domain. Much like DCE, this approach also uses a central trusted authority.

The existing network approaches are inflexible in that they use a central trusted authority and/or provide for the issuance of group certificates only on certain occasions, such as when a client joins a group or logs onto the system. Furthermore, a group server will not issue a group certificate for a particular client unless that client is explicitly listed on its group membership list. These limitations hamper the implementation of a "nested" group, wherein a group has other groups, i.e., subgroups, as members and client membership in the nested group may be indirectly proven through client membership in a sub-group. Nested groups are difficult to implement on existing systems because, among other things, the membership lists of each of these groups may be stored on different machines on the network. Therefore, what is needed is a more flexible approach to the issuance of group certificates.

SUMMARY OF THE INVENTION

In accordance with the invention, on-line group servers issue group membership or group non-membership certificates upon request. Furthermore, when a requester requests a group certificate for a particular entity, the associated group server makes a dynamic decision, regarding the entity's membership in the group, which may be more involved than simply referring to a membership list. These capabilities provide for, among other things, the implementation of "nested" groups, wherein an entity may indirectly prove membership in a first, or nested, group by proving membership in a second group which is a member of the first group. In the nested group situation, the dynamic decision may involve the group server of the nested group obtaining proof of the entity's membership or non-membership in the second group. Proof of membership or non-membership may include a group certificate and/or a group membership list. Alternatively, the requester may present proof of the entity's membership or non-membership in the second group to the group server of the nested group. In the common case, the requester and the entity will be the same.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 2 is an example of an Access Control List (ACL);

FIG. 3 is an example of a non-revocation certificate;

DETAILED DESCRIPTION OF AN ILLUSTRATIVE EMBODIMENT

Introduction

Figure 1:
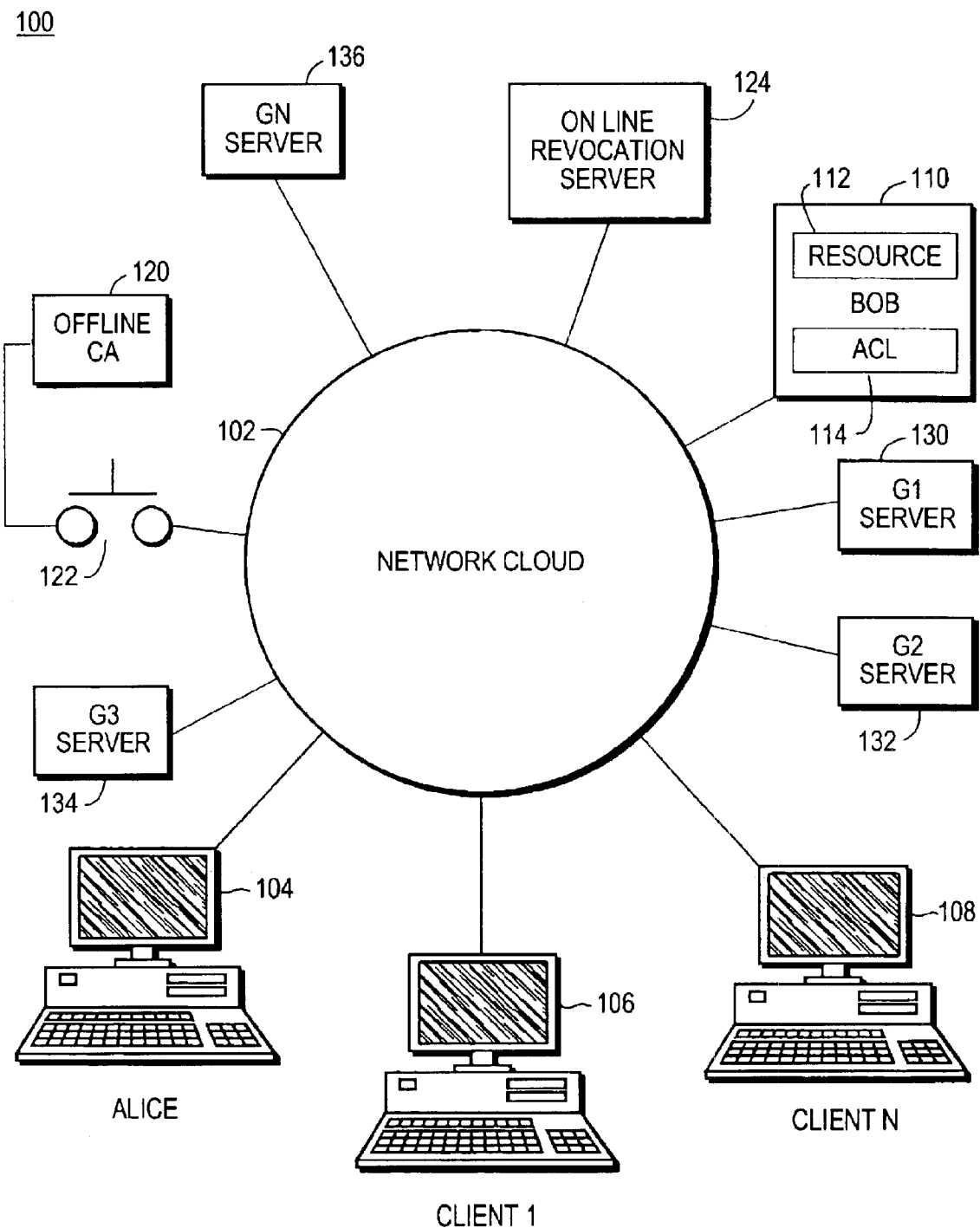
FIG. 1 is a block diagram of a computer network.

The basic concept of the invention is to support the dynamic issuance of group certificates through the use of on-line group servers which issue group membership or group non-membership certificates upon request to a requester. The exemplary embodiment is directed to the client-server situation wherein the client is not individually authorized for access to a resource but may gain access by means of a group membership certificate (necessary for access to a particular resource) or a group non-membership certificate (when a group is specifically excluded from access to a resource). These certificates will include time stamps designating the date and time of issue. For each resource that it protects, a resource server typically establishes an expiration period beyond which an issued certificate ceases to be valid.

Each group has a name and the location of its group server can thus be obtained from a system directory. The group also has a public key and an associated private key which is used for signing group certificates. Further, a group can have as members individuals and other groups. That is, a "parent", or "nested", group may have "child" groups for members. It may even have a complicated Boolean expression for membership, such as G1→(G2 AND G3) AND NOT (G4), meaning that all members of groups G2 and G3 are in the group G1, except for members of group G4.

A group membership or group non-membership certificate usually indicates membership status for a specified name, e.g., client "Alice" is a member of group G1, although the certificate may also indicate membership status for a specified public key or other identity. In most cases, there will be a group membership list associated with a group which will be maintained by an on-line group server. However, the on-line group server may need to dynamically decide whether a given client is a member of the group, i.e. the server may do more than simply refer to a membership list. In this case, group membership will be determined by some other criterion. For example, group membership may be determined by a particular attribute of a client. In another case, where the client may be a member of a child group, the on-line group server may obtain proof of the client's membership in the child group. Alternatively, the client may present the proof of membership in the child group to the on-line group server.

A new group membership certificate can be obtained from an on-line group server at any time and presentation of the certificate to the resource server will be sufficient to prove membership in the group. However, an off-line group server infrequently issues certificates, such as when a client joins the group or when the entire membership list is updated. As a result, the client will request a newly-issued non-revocation certificate from an associated on-line revocation server and present it, along with the group membership certificate, to the resource server.

Group Memberships and Nested Groups

As discussed above, a group may have as its members other groups, or subgroups and the client may contact child group servers to obtain proof of membership in a child group. For example, the aforementioned client Alice may be attempting to access a resource on resource server "Bob". If Alice is not listed as an individual on the resource ACL, but groups G1, G2 and G3 are listed on the ACL, Bob returns to Alice the message:

"Access denied, unless you can prove membership in group G1, G2 or G3."

In contrast to traditional systems, this message does not have to be sent during session establishment (i.e., the initial handshake between the client and the server). It may be the case that Alice had previously established the session with Bob and at this later time has decided to access the resource protected by Bob. At this point Bob may challenge Alice to present additional credentials. Alice may have recently obtained a membership certificate for one of these "root" groups in the course of obtaining access to some other server or for some other reason. If not, the client system can prompt the human operator to provide guidance as to the groups of which the client is likely to be a member. This may save substantial time if there are a large number of groups on the ACL.

If human intervention is not desirable, an exhaustive search may be undertaken: Alice communicates with on-line group servers containing the group membership lists of groups G1, G2 and G3 and attempts to obtain a membership certificate from one of these servers.

In another variation, rather than performing an exhaustive search, Alice may be able to narrow the search by relying on previously stored information to determine groups in which Alice is likely to be a member. For example, if Alice has an old group membership certificate for group G1, Alice can attempt to obtain a new group membership certificate from the G1 group server before undertaking an exhaustive search for a group certificate.

Although Alice may not be listed as a member of group G1, group G1 may be a nested group, i.e., it may be a parent to the child groups, or subgroups, G5 and G6. The G1 server will ask Alice:

"Can you prove membership in group G5 or G6?"

Alice then communicates with the G5 and G6 servers. For example, if group G5 lists Alice as a member, the G5 server returns a group membership certificate in group G5. Alice returns to the G1 server to request a group membership certificate, armed with the certificate from the G5 server. The G1 server then grants Alice a group membership certificate. Now, armed with the certificate from root group G1, Alice can go to Bob and obtain access to the requested resource. A group membership certificate is not the only mechanism by which Alice may prove membership in group G5 to the G1 server. For example, Alice may alternatively present the group G5 membership list, signed by group G5, or some other proof of group membership.

The example presented above is rather simple. In some cases, Alice will be unable to establish membership in either a root or a child group and will be denied access to the resource. In other cases, Alice may have to search down several subgroup levels before finding membership in a group. To facilitate this task, Alice maintains a family tree for each root group, tracing the path of subgroups visited during a search. Alice can easily detect and abort loops (where G5 is a member of G1 is a member of G5 is a member of G1 and so on). When membership in a subgroup is found, Alice moves back up the path collecting a group membership certificate from each successive group server and presenting it to the next higher group server until the root group is reached. Alice then presents to Bob the group membership certificate issued by the root group server.

In the above scenario, it has been assumed that the group servers issuing group membership certificates are on-line and thus create newly-issued group certificates at runtime. In that case, the group membership certificates created at runtime are fresh enough so as not to need any further proof of non-revocation. If a group certificate is "old", i.e., it was obtained by the client more than some specified time prior to a request for access to a resource, as ascertained from a time stamp included in the certificate, the resource server will require a newly-issued certificate from the on-line group server.

In another variation, rather than asking Alice to present proof of membership in group G5 or G6, the G1 server may decide to do the work. In this case, the G1 server will directly communicate with the G5 and/or G6 server(s) to determine whether Alice is a member of one of these groups.

In a different example, the G1 group server may grant membership to anyone who can prove membership in group G11 and non-membership in group G12. Accordingly, Alice will retrieve a group membership certificate from the G11 group server and a group non-membership certificate from the G12 group server and present those certificates to the G1 group server. The G1 group server will then issue a G1 group membership certificate which Alice will present to Bob.

Group Non-membership Certificates

A resource server may also prohibit access to a resource based on client membership in one or more groups. In this case, the client will gather and present group non-membership certificates stating that the client is not a member of the designated groups. For example, group G1 members may be permitted access to a resource, unless they are also group G2 members. Alice will have to prove both membership in group G1 and NON-membership in group G2. To prove non-membership in group G2, Alice will present a group G2 non-membership certificate to Bob. Alice requests a non-membership certificate from the G2 group server and presents the certificate, along with a group G1 membership certificate to Bob.

The work required to gather the credentials necessary to prove group non-membership is more intensive than that required for group membership. For each prohibited root group, the client will be required to prove non-membership in each and every group extending from the root. For example, Bob may deny resource access to all members of group G2. Therefore, Alice will request a group non-membership certificate from the G2 server. The root group G2 might have as members the child groups, or subgroups, G7 and G8. The G2 group server will ask Alice:

"Can you prove non-membership in groups G7 and G8?"

Alice then requests a group non-membership certificate from both the G7 and G8 servers. If group G7 also lists the groups G9 and G10, Alice requests a group non-membership certificate from both the G9 and G10 servers. Alice presents the G9 and G10 group non-membership certificates to the G7 server which then issues a group non-membership certificate. Alice next presents the G7 and G8 group non-membership certificates to the G2 server and receives a G2 group non-membership certificate. Now, armed with a group non-membership certificate from group G2, Alice can go to Bob and prove non-membership in root group G2.

An Embodiment of the Invention

As shown in FIG. 1, a computer network 100 includes a network "cloud" 102 that provides the interconnection for devices on the network. The network cloud 102 may represent a simple local area network, for example, an Ethernet on one floor of a building. At the other extreme, it may represent the entire worldwide Internet. The network cloud 102 may contain transmission lines, repeaters, routers, network backbones, network interconnect points, etc., depending upon the extent of the network which it represents.

A client can be any device capable of sending messages over the network and is generally thought of as an individual workstation, a desk-top computer, a mini-computer accessed by a terminal, a personal digital assistant (PDA), an embedded device, or some other relatively simple computer. A client is often a computer operated by one person, although an independently operating computer or a program operating without human intervention can also be a client. Client computer Alice 104 and two additional client computers 106, 108 are shown connected to the network cloud 102. A modern network may include thousands of client computers.

A resource server Bob 110 is also connected to network cloud 102. A resource server can be any device capable of receiving messages over a network and is usually thought of as a larger computer which contains resources to which client computers desire access. For example, a resource may be a data base, a file system, etc. A resource 112 on resource server Bob 110 represents any resource to which a client may desire access. An Access Control List (ACL) 114 contains a list of clients which are permitted to access the resource 112. As a convenience, clients may be assigned membership in groups of clients, designated groups G1, G2, G3, . . . , GN, having associated group servers 130, 132, 134, 136. Accordingly, ACL 114 may also contain the names of groups whose member clients are permitted access to the resource 112.

An Off-line Certification Authority (OCA) server 120 issues identity certificates used by clients to identify themselves when seeking access to various resources on various servers, such as client Alice 104 access to resource 112. A switch 122 represents the ability of the OCA server 120 to be temporarily connected to the network cloud 102 so that it may, at selected times, issue an identity certificate to a client. The switch 122 is in "open" position most of the time to protect the OCA server 120 from attacks by malicious persons.

An On-line Revocation (OR) server 124 is connected to network cloud 102 on a substantially permanent basis. The OR server 124, upon request from a client, issues a non-revocation certificate stating that a particular client's identity certificate, previously issued by the OCA server 120, has not been revoked as of the time stamp. The non-revocation certificate is then transmitted to the requesting client.

FIG. 2 shows a typical Access Control List (ACL) 200 having a name field 202, in this case "112", and access entries. The first access entry 204 specifies that client Alice 104 is permitted access. Additional access entries for client computers x1 and x2 205, 206, along with groups G1, G2 and GN 208, 210, 212, round out the list.

FIG. 3 shows a typical non-revocation certificate 300 issued to client Alice 104 by the OR server 124. Client Alice 104 had previously obtained a certificate from the OCA is server 120. The OR server 124 maintains a list of certificates which have been revoked. Upon receipt of a request from a client, the OR server 124 checks its revocation list and, assuming that the subject certificate is not on that list, issues a non-revocation certificate. The first entry 302 in the non-revocation certificate 300 indicates that a previously issued certificate for client Alice 104 has not been revoked.

Additionally, the non-revocation certificate 300 includes a signature entry 304, and a time stamp comprising an issue date entry 306 and time entry 308.

Resources may have recency requirements for credentials, such as non-revocation certificates, group membership certificates and group non-membership certificates. For example, resource server Bob 110 may require that the credentials used to access the resource 112 be no more than one-day old, or possibly no more than 10 minutes old, depending upon the level of security desired for the resource 112, the number of clients requesting the resource 112, and the number of requests which OR server 124 can handle.

Figure 4:
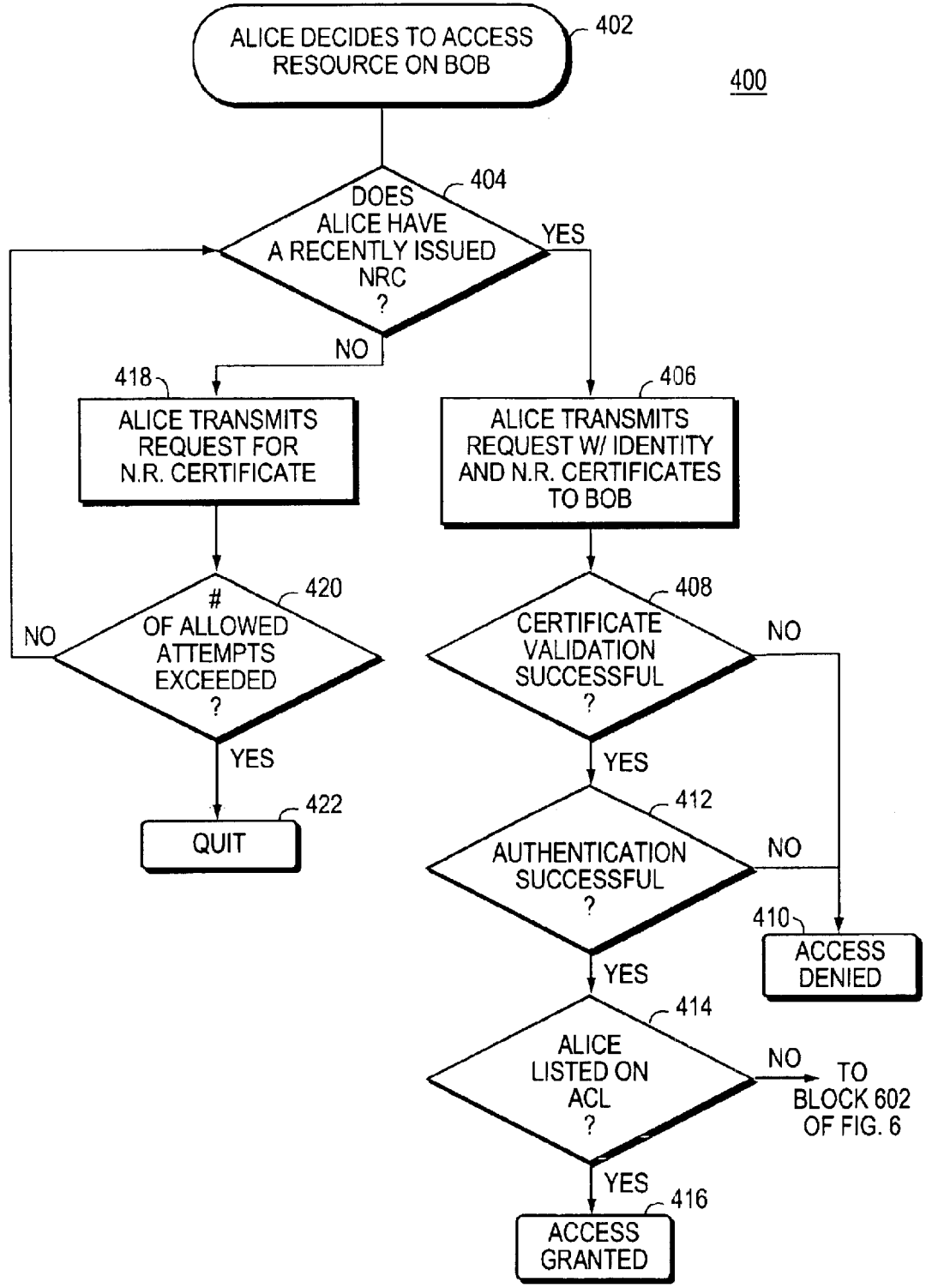
FIG. 4 is a flow diagram of a client access authorization procedure.

FIG. 4 is an illustrative flow diagram 400 of the client access authorization procedure. Each entity on the computer network includes a processor with an associated memory which may contain instructions for performing one or more steps of the procedure. Persistent storage of these instructions may be in a server system remote from the network entity and its processor. The electrical signals that carry digital data representing the instructions are exemplary forms of carrier waves used for transporting information from a server system to a network entity. At block 402 client Alice 104 "decides" to request access to the resource 112. For example, the decision may be initiated by a human typing the appropriate command, or clicking a cursor on an appropriate icon, etc. In an alternative example, client Alice 104 may have an internal timer or other event that prompts it to make a request for the resource 112.

At decision block 404 client Alice 104 determines whether it has a recently-issued non-revocation certificate issued by a trusted authority, or a set of non-revocation certificates each corresponding to a particular identity certificate. A recently-issued certificate may be stored in the cache, for example, as the result of an earlier request for access to the resource 112.

If client Alice 104 has a recently-issued non-revocation certificate, it transmits an access request over the computer network 100 to resource server Bob 110, along with its identity and non-revocation certificates, at block 406.

At decision block 408 resource server Bob 110 attempts to validate the identity and non-revocation certificates presented at block 406. For each identity certificate, resource server Bob 110 determines whether the corresponding non-revocation certificate is valid. The validity of the non-revocation certificate is determined by verifying its signature and by further verifying that its time stamp falls within the recency requirements for the resource. If the validation fails, access is denied at block 410.

If the validation of the certificates is successful, at decision block 412 resource server Bob 110 attempts to authenticate client Alice 104. As described above, a variety of authentication methods may be employed by resource server Bob 110. If the authentication fails, access is denied at block 410.

If the authentication of client Alice 104 is successful, at decision block 414 resource server Bob 110 determines whether client Alice 104 is listed on the resource ACL 200. If client Alice 104 is listed, access is granted at block 416. Otherwise, the procedure branches to decision block 602 of the flow diagram 600 of FIG. 6.

If at decision block 404, client Alice 104 does not have a recently-issued non-revocation certificate, client Alice 104 requests a new non-revocation certificate from the OR server 124 at block 418. In response, the OR server 124 checks its list of revoked identity certificates, and if client Alice 104 does not appear on the list of revoked certificates, the OR server 124 issues a non-revocation certificate. Client Alice 104 may store a copy of the non-revocation certificate in its cache for use whenever it desires access to a resource.

Client Alice 104 is allowed a specified number of attempts (e.g. 5) to obtain a non-revocation certificate from OR server 124 before the process aborts. It is desirable to permit such attempts because network congestion, server congestion, or similar problems may cause inadvertent failures. If the specified number of attempts is exceeded at decision block 420, then no further attempts are allowed and the access authorization procedure terminates at block 422. Human intervention may reset the revocation list in OR server 124. In an exemplary embodiment of the invention, the OR server 124 will simply not respond in the event that the identity certificate for client Alice 104 has been revoked. Accordingly, decision block 420 is necessary to shut down requests from client Alice 104. In an alternative embodiment of the invention, a message stating that the identity certificate has been revoked is returned to client Alice 104 from the OR server 124. This message can be added to decision block 420 to bring the procedure to a halt before the number of attempts is exceeded.

In summary, the computer network 100, the ACL 200 of the resource 112 of resource server Bob 110, the issuance of identity certificates by the OCA server 120, the issuance of non-revocation certificates by the OR server 124, and the exemplary access authorization procedure traced by the flow diagram 400 provide a secure and scaleable security system. The work of gathering non-revocation certificates is handled by the clients, and a resource server is not burdened with checking revocation status for each of the respective clients that request access to resources.

Groups of Computers and Nested Groups

Figure 5:
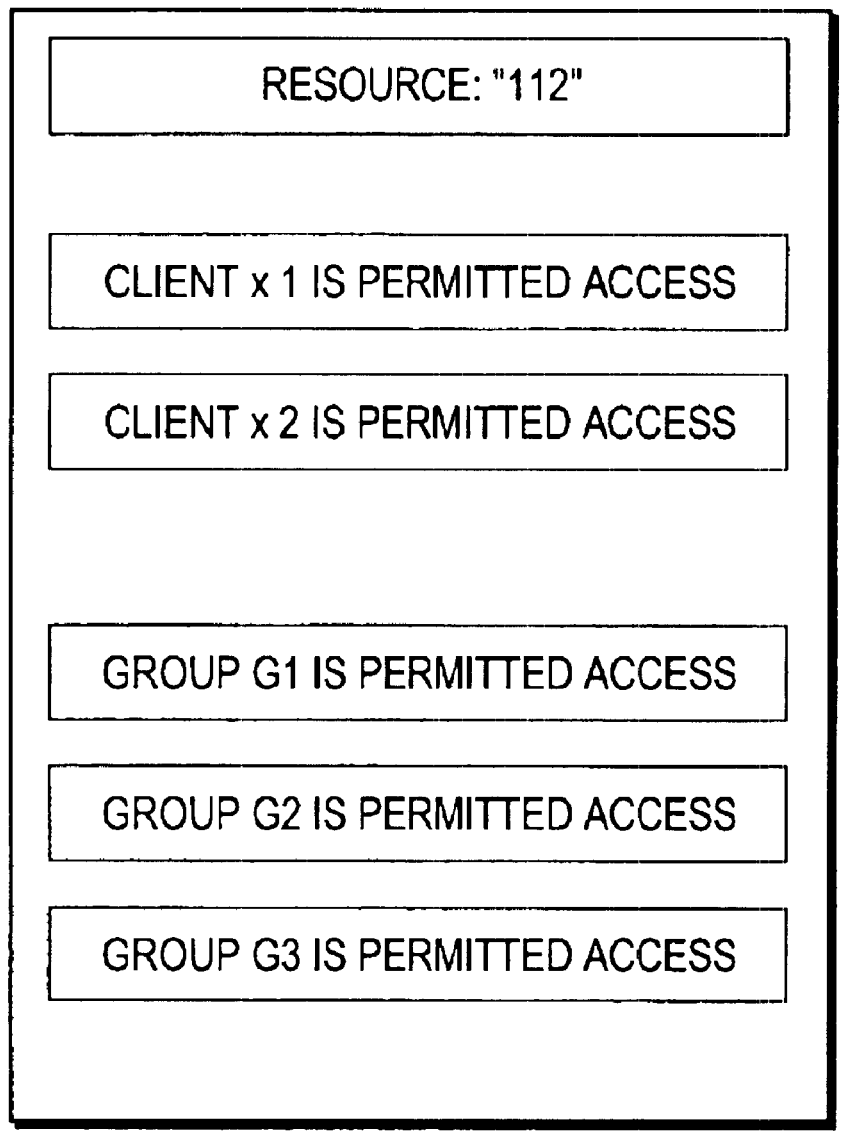
FIG. 5 is a second example of an ACL.

FIG. 5 illustrates an ACL 500 for resource server Bob 110 in which client Alice 104 is not listed individually. Instead, ACL 500 identifies groups G1, G2 and G3 as having authenticated access to the resource 112. Any client which can prove that it is a member of a group having authenticated access to the resource 112 has access individually.

Figure 6:
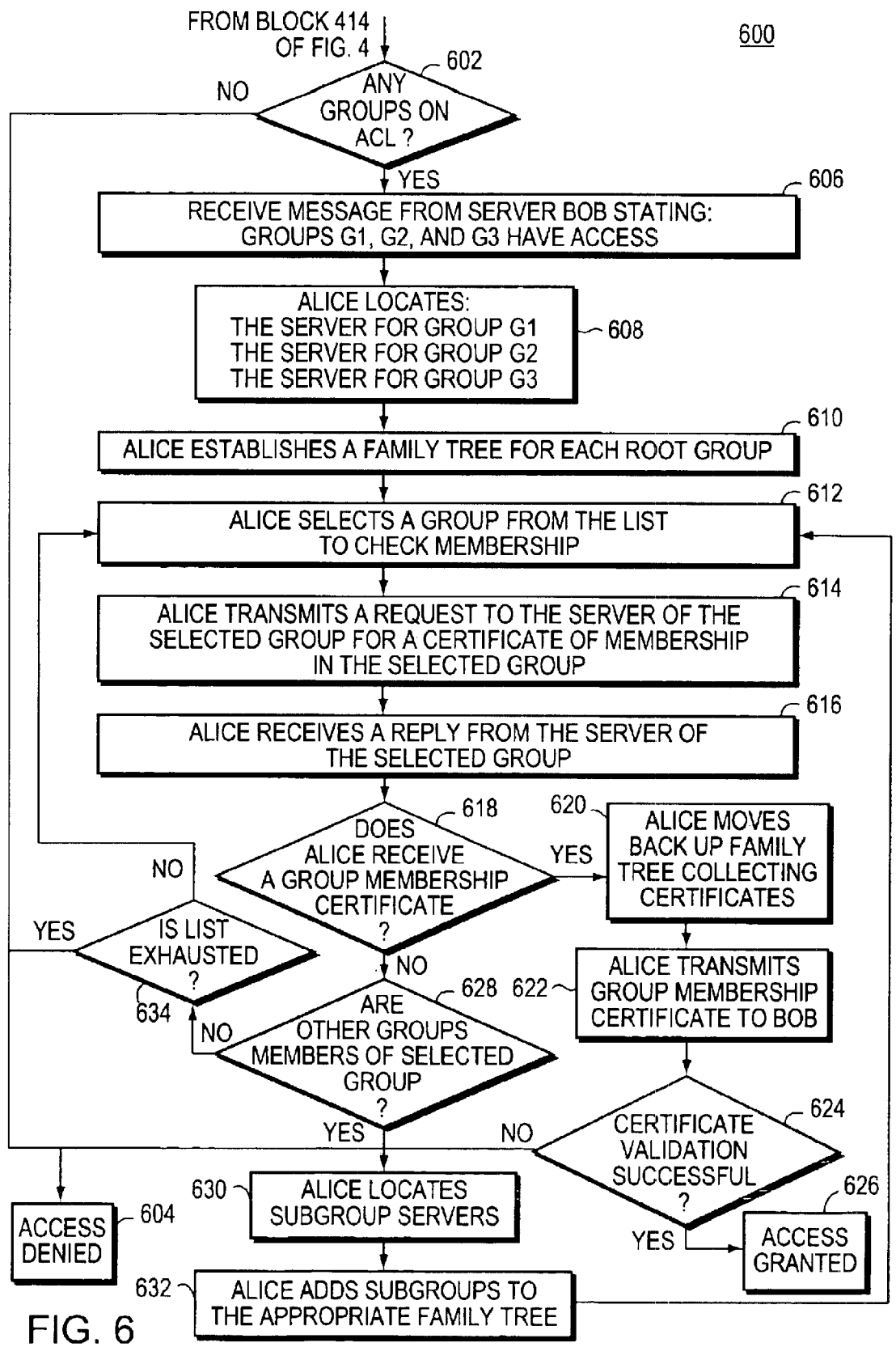
FIG. 6 is a flow diagram of a group membership access authorization procedure.

FIG. 6 is an illustrative flow diagram 600 of the group membership access authorization procedure. Again, each entity on the computer network includes a processor with an associated memory which may contain instructions for performing one or more steps of the procedure. If client Alice 104 can prove that it is a member of either a listed group or a sub-group of a listed group, then it is authenticated for access to the resource 112. Decision block 602 is entered by transfer from decision block 414 of the client access authorization procedure shown in FIG. 4. The resource server Bob 110 has determined at block 414 that client Alice 104 is not listed on the ACL for resource 112 and therefore does not have an individual client authorization for access.

If at decision block 602, the ACL 500 did not list any groups with authorization for access to the resource 112, the procedure terminates at block 604. In the present example, however, at block 606 resource server Bob 100 returns a message to client Alice 104 stating that groups G1, G2, and G3 have access to the resource 112.

At block 608 client Alice 104 searches for and locates the address of the G1 server 130 which maintains the membership list for group G1; the address of the G2 server 132 which maintains the membership list for group G2; and, finally, the address of the G3 server 134 which maintains the membership list for group G3.

At block 610 client Alice 104 establishes a family tree for each root group designated by resource server Bob 110 at block 606 as having resource access. Below, at block 632, additional groups may be added to the family tree when a parent identifies one or more child groups, or subgroups. This addition is recursive and subgroups continue to be added to the family tree maintained at block 610 until client Alice 104 proves membership in a group or all subgroups have been identified.

At block 612 one root group is selected for determination of its membership list. The group may be selected by any useful criterion, for example, alphabetical by group name, numerical by address, or by the order in which the groups were added to the list, etc.

At block 614 client Alice 104 transmits to the group server selected in block 612 a request for a membership certificate stating that client Alice 104 is a member of the group. At block 616, client Alice 104 receives a reply to the request sent out at block 614.

If at decision block 618 client Alice 104 does not receive a group membership certificate, it is then determined at decision block 628 whether any other groups are members of the selected group. At block 630 client Alice 104 locates the group servers for any identified subgroups and at block 632 these subgroups are added to the appropriate family tree maintained at block 610.

If at decision block 628 no additional groups are determined to be members of the family tree of the selected root group, and if at decision block 634 all of the root groups maintained at block 610 have been checked, client Alice 104 does not have access through group membership and the procedure terminates at block 604.

If at decision block 634 all root groups maintained at block 610 have not been checked, the next root group is selected at block 612. The new group selected is then investigated in order to determine if client Alice 104 is a member of that group or any sub-group. The procedure continues until all identified root groups and their family trees have been investigated.

If at decision block 618 client Alice 104 receives a group membership certificate, client Alice 104 moves back up the family tree, presenting a certificate of membership in each child group to each higher level parent group server at block 620. At block 622 client Alice 104 transmits to resource server Bob 110 the group membership certificate associated with the highest group in the chain, i.e. the root group authorized for access on the resource ACL 114.

At decision block 624 resource server Bob 110 attempts to validate the group certificate presented at block 622. The validity of the group certificate is determined by verifying its signature and by further verifying that its time stamp falls within the recency requirements for the resource. If the validation fails, access is denied at block 604, otherwise access is granted at block 626.

Figure 7:
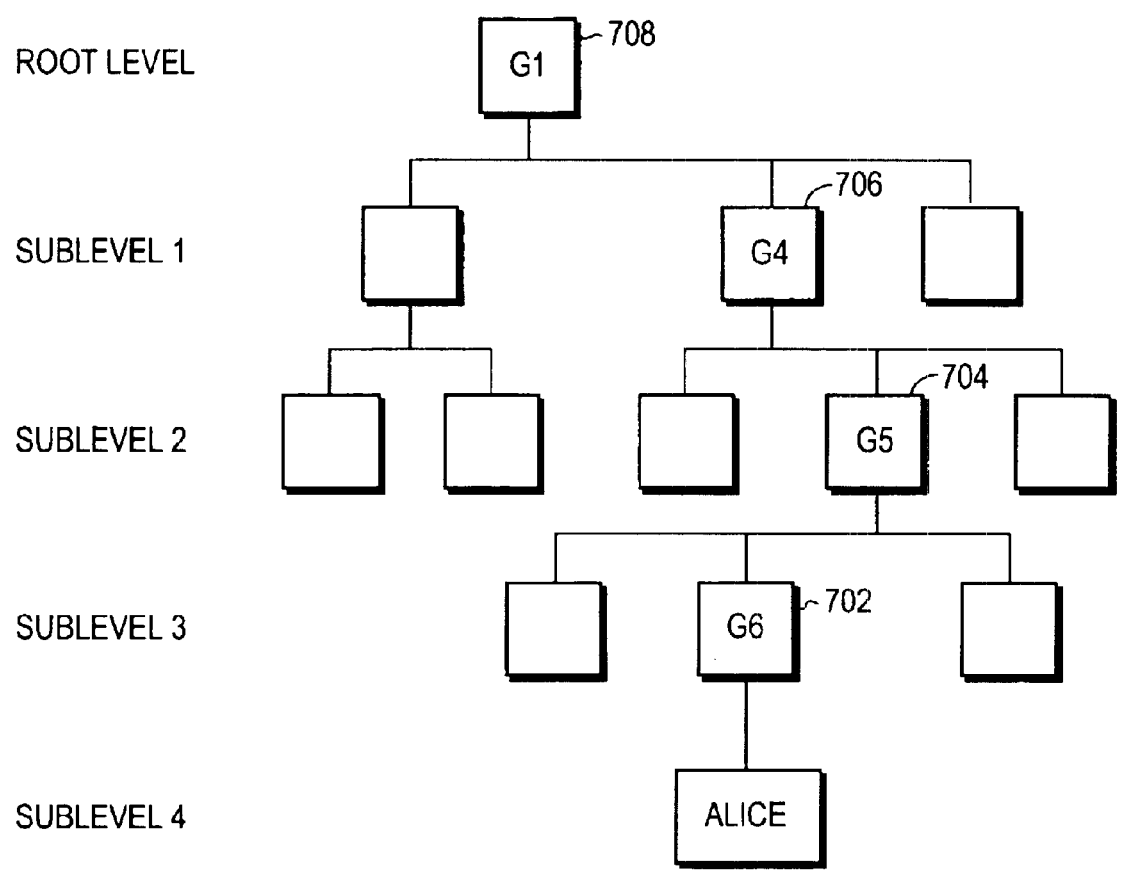
FIG. 7 is an example of a group family tree.

An exemplary family tree maintained by client Alice 104 is shown in FIG. 7. It has been determined from the procedure that client Alice 104 is an individual member of group G6, as shown at the first entry 702. It has also been determined that group G6 is a member of group G5, as shown at the second entry 704; group G5 is a member of group G4, as shown at the third entry 706; and group G4 is a member of group G1, as shown at the fourth entry 708. As a member of group G6 it can prove membership in group G5. Next, as a member of group G5 it can prove membership in group G4. Finally, as a member of group G4 it can prove membership in group G1.

Boolean Logic

Examples of the use of Boolean logic to control access of various subgroups to access to the resource 112 were given above. The process flow diagram 600 of FIG. 6, and the resulting credentials which client Alice 104 presents to resource server Bob 110, give the resource server Bob 110 the tools to implement a Boolean logic process to limit access to the resource.

For example, resource server Bob 110 may refuse access to the resource 112 if client Alice 104 is a member of some suspect group. By having the group server responsible for the membership list for the suspect group issue a non-membership certificate, resource server Bob 110 can implement Boolean logic to prevent any client unable to present a non-membership certificate from accessing the resource. For example, if all members of group G3 are denied access to the resource and members of groups G1 and G2 are permitted access to the source, then the Boolean expression:

(G1 AND G2) AND NOT (G3)

will be FALSE in the event that resource server Bob 110 does not receive a valid non-membership certificate indicating that client Alice 104 is not a member of group G3. The FALSE result in the Boolean expression will prevent client Alice 104 from gaining access to the requested resource on resource server Bob 110.

The foregoing description has been directed to client access to a server resource. The present invention, however, can be applied to any computer network transmission, such as an e-mail message, where authorization is required. In addition, a typical network device may assume either the client or the resource server role, i.e., it may be a client in one resource access and a server in another resource access. The foregoing description has also been directed to use of an ACL for client authorization decisions. The present invention, however, can employ many other authorization decision mechanisms known in the art.

The foregoing description has also been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of employing a resource server to provide resources to a client, the method comprising:
   associating each resource with a respective age threshold on the basis of a level of security desired for the resource, in which the age threshold represents the oldest allowable age of a membership certificate that can be associated with a request for the resource, such that the resource can be provided in reply to the request only if the membership certificate has an age that is not older than the oldest allowable age,
   receiving a request from the client for at least one of the resources, the request being associated with a membership certificate that was issued by a server other than the resource server and that certifies at least one of group membership and group non-membership of the client as of a time,
   determining an age of the membership certificate relative to that time,
   for each of the at least one resource that is requested by the client:
      comparing the age of the membership certificate with the age threshold associated with the resource, and
      providing the resource to the client only if the age is not older than the age threshold.

2. The method of claim 1, wherein the membership certificate certifies group membership, and providing the resource to the client further includes:
   providing the resource to the client only if the group is associated with an access control-list.

3. The method of claim 1, wherein the membership certificate certifies group non-membership, and providing the resource to the client further includes:
   providing the resource to the client only if the group is associated with a non-access control-list.

4. A system for providing resources to a client, the system comprising:
   a resource server that is in communication with the client, that controls access to the resources, and that is configured to:
   associate each resource with a respective age threshold on the basis of a level of security desired for the resource, in which the age threshold represents the oldest allowable age of a membership certificate that can be associated with a request for the resource, such that the resource can be provided in reply to the request only if the membership certificate has an age that is not older than the oldest allowable age,
   receive a request from the client for at least one of the resources, the request being associated with a membership certificate that was issued by a server other than the resource server and that certifies at least one of group membership and group non-membership of the client as of a time,
   determine an age of the membership certificate relative to that time,
   for each of the at least one resource that is requested by the client:
      compare the age of the membership certificate with the age threshold associated with the resources, and
      provide the resource to the client only if the age is within the age threshold.

5. The system of claim 4, wherein the membership certificate certifies group membership, and the server is configured to:
   provide the resource to the client only if the group is associated with an access control-list.

6. The system of claim 4, wherein the membership certificate certifies group non-membership, and the server is configured to:
   provide the resource to the client only if the group is associated with a non-access control-list.

7. A processor-readable medium including instructions to cause a processor of a resource server to:
   associate each of two or more resources with a respective age threshold on the basis of a level of security desired for the resource, in which the age threshold represents the oldest allowable age of a membership certificate that can be associated with a request for the resource, such that the resource can be provided in reply to the request only if the membership certificate has an age that is not older than the oldest allowable age,
   receive a request from a client for at least one of the two or more resources, the request being associated with a membership certificate that was issued by a server other than the resource server and that certifies at least one of group membership and group non-membership of the client as of a time,
   determine an age of the membership certificate relative to that time,
   for each of the at least one resource that is requested by the client:
      compare the age of the membership certificate with the age threshold associated with the resource, and provide the resource to the client only if the age is within the age threshold.

8. The processor program of claim 7, wherein the membership certificate certifies group membership, and the instructions to provide the resource to the client further include instructions to:

provide the resource to the client only if the group is associated with an access control-list.

9. The processor program of claim 7, wherein the membership certificate certifies group non-membership, and the instructions to provide the resource to the client further include instructions to:

provide the resource to the client only if the group is associated with a non-access control-list.

10. A processor data-signal embodied in a carrier wave and representing instructions to cause a processor of a resource server to:

associate each of two or more resources with a respective age threshold on the basis of a level of security desired for the resource, in which the age threshold represents the oldest allowable age of a membership certificate that can be associated with a request for the resource, such that the resource can be provided in reply to the request only if the membership certificate has an age that is not older than the oldest allowable age, receive a request from a client for at least one of the two or more resources, the request being associated with a membership certificate that was issued by a server other than the resource server and that certifies at least one of group membership and group non-membership of the client as of a time, determine an age of the membership certificate relative to that time, for each of the at least one resource that is requested by the client:

compare the age of the membership certificate with the age threshold associated with the resource, and provide the resource to the client only if the age is within the age threshold.

11. The processor data-signal of claim 10, wherein the membership certificate certifies group membership, and the instructions to provide the resource to the client further include instructions to:

provide the resource to the client only if the group is associated with an access control-list.

12. The processor data-signal of claim 10, wherein the membership certificate certifies group non-membership, and the instructions to provide the resource to the client further include instructions to:

provide the resource to the client only if the group is associated with a non-access control-list.

* * * * *